United States Patent Office 3,203,936
Patented Aug. 31, 1965

3,203,936
CROSS-LINKING ETHYLENE POLYMERS
David S. Breslow and Harold M. Spurlin, Wilmington,
Del., assignors to Hercules Powder Company, Wilmington, Del., a corporation of Delaware
No Drawing. Filed Mar. 15, 1961, Ser. No. 95,820
The portion of the term of the patent subsequent to
Oct. 16, 1979, has been disclaimed
10 Claims.  (Cl. 260—79.3)

This invention relates to cross-linking polymers and to the vulcanizates so produced. More particularly, the invention relates to cross-linking ethylene polymers with aliphatic polysulfonazides and to the vulcanizates so produced.

In the past the rubber industry has depended almost entirely on sulfur, sulfur-bearing materials, and peroxides as vulcanizing, i.e., cross-linking, agents. These agents are not, however, effective in covulcanizing blends of ethylene polymers with other polymers. It has more recently been reported that certain aromatic sulfonazides are capable of acting as vulcanizing agents. However, these prior art sulfonazides are relatively insoluble in hydrocarbon solvents and they give a blown, i.e., a foamed product.

Now, in accordance with this invention it has been found that ethylene polymers can be cross-linked by heating in the presence of an aliphatic polysulfonazide having the formula $$R(-SO_2N_3)_x$$

where $x$ is an integer greater than 1 and R is an organic radical selected from the group consisting of aliphatic and aryl aliphatic radicals, said sulfonazide groups being attached to aliphatic carbon atoms, to give an unblown vulcanizate that is tough, resilient, solvent resistant, and color and odor free. In addition, blends of these ethylene polymers with other polymers can be covulcanized in accordance with this invention to give products which are useful in the rubber tire industry.

Any aliphatic polysulfonazide as defined above can be used in the process of this invention. Most preferably, and for most applications, the aliphatic polysulfonazides will be alkyl polysulfonazides containing from about 5 to about 30 carbon atoms, from about 2 to about 20 sulfonazide groups, and having a solubility of at least about 1.0% by weight in n-heptane at a temperature of 95° C. Exemplary of the most preferred alkyl polysulfonazides are 1,7-heptane bis(sulfonazide), 1,10-decane bis(sulfonazide), etc. These polysulfonazides can also contain ether, sulfide, ester, alcohol, etc., groups which are inert to the cross-linking reaction. Typical of the alkyl polysulfonazides substituted with inert groups are 7-oxatridecane-1,13-bis(sulfonazide), 6-thiaundecane 1,11-bis(sulfonazide), etc. For certain applications aliphatic or aryl aliphatic polysulfonazides containing more than 30 carbon atoms, more than 20 sulfonazide groups, and/or having a solubility of less than about 1.0% by weight in n-heptane at a temperature of 95° C. can be used in the process of this invention. Exemplary of these aliphatic or aryl aliphatic polysulfonazides are 1,3- and 1,4-bis(sulfonazidomethyl) benzene, 1,9,18-octadecane tris(sulfonazide), poly(ethylenesulfonazide), poly(sulfonazidomethylstyrene), the copolymer poly(sodium ethylene sulfonate-ethylene sulfonazide), etc.

Any polymer, homopolymer, or copolymer containing at least about 25 mole percent of ethylene can be cross-linked by the process of this invention. Exemplary of the polymers that can be cross-linked are low and high density polyethylene, ethylene-propylene copolymers, ethylene-butylene copolymers, ethylene-vinyl acetate copolymers, ethylene-propylene-diene terpolymers such as ethylene-propylene-butadiene terpolymers, ethylene-propylene-isoprene terpolymers, etc. (containing no more than about 10 mole percent of the diene). In addition, any one of these polymers can be blended with another polymer and covulcanized.

The cross-linking process of this invention can be carried out by heating the ethylene polymer in the presence of the aliphatic polysulfonazide to a temperature at which the sulfonazide decomposes. This temperature varies over a wide range, but in general will be from about 120° C. to about 250° C. Various amounts of the cross-linking agent can be added, the optimum amount depending on the amount of cross-linking desired, the specific aliphatic polysulfonazide employed, etc. In general, the amount added, based on the weight of the ethylene polymer, will be from about 0.1% to about 20%.

The cross-linking agent can be incorporated with the ethylene polymer in any desired fashion; for example, it can be uniformly blended by simply milling on a conventional rubber mill or dissolved in a solution containing the polymer. By either means the aliphatic polysulfonazide is distributed throughout the polymer and uniform cross-linking is effected when the blend is subjected to heat. Other methods of mixing the cross-linking agent with the polymer will be apparent to those skilled in the art.

In addition to the cross-linking agent, other ingredients can also be incorporated. The additives commonly used in rubber vulcanizates can be used here also, as, for example, extenders, fillers, pigments, plasticizers, stabilizers, etc. Exemplary of the fillers that can be added are calcium carbonate, iron oxide, carbon black, silica, calcium silicate (hydrated), alumina, etc. The presence of a filler, and in particular carbon black, is beneficial in some cases. Obviously, there are many cases in which a filler is not required or desired and excellent results are achieved when only the cross-linking agent is added.

The following examples are presented for purposes of illustration, parts and percentages being by weight unless otherwise specified. The molecular weight of the polymers vulcanized in these examples is indicated by the reduced specific viscosity (RSV) given for each. By the term "reduced specific viscosity" is meant the $\eta_{sp/c}$ determined on a 0.1% solution (0.1 g. of the polymer per 100 ml. of solution) of the polymer in decathydronaphthalene at a temperature of 135° C.

The extent of cross-linking is determined by analysis for percent gain in insolubility in solvents in which the un-cross-linked polymer is soluble, hereinafter termed "percent gel."

Percent gel is determined as follows: A weighed sample of polymer is soaked in toluene for 60 minutes at a temperature of 100° C. The sample is then removed and dried to constant weight. The weights of initial and final sample are corrected for polymer and copolymer content based on knowledge of components. From these figures $$\frac{\text{Corrected dry weight}}{\text{Corrected initial weight}} \times 100 = \text{percent gel}$$

Example 1

An aliphatic bis-sulfonazide cross-linking agent was prepared as follows: 1,10-decanvedithiol dissolved in a mixture of glacial acetic acid in water was treated with chlorine gas. The resulting 1,10-decane disulfonyl chloride was then reacted with sodium azide to give a good yield of high purity 1,10-decane bis(sulfonazide). The resulting 1,10-decane bis(sulfonazide) had a solubility in n-heptane at a temperature of 95° C. of 1.7%. To 147 parts of trichloroethylene were added 2.6 parts of an ethylene-propylene copolymer containing approximately 70 mole percent of ethylene and having an RSV of 3.0. To the resulting solution was added 5 parts of the 1,10-decane bis(sulfonazide) and the solvent allowed to evaporate overnight at room temperature. The polymer was then cured by heating in a closed iron mold for 25 minutes at a temperature of 195 to 205° C. The resulting unblown vulcanizate was a strong, resilient rubber substantially insoluble in toluene at 100° C. The cross-linking process produced essentially no discoloration.

*Example 2*

To 100 parts of an ethylene-propylene copolymer containing 69 mole percent of ethylene and having an RSV of 3.6 were added 50 parts of high abrasion furnace black, 5 parts of zinc oxide, 1 part of stearic acid, and 5 parts of 1,10-decane bis(sulfonazide) moistened with a fraction of a part of paraffin oil. The mixture was blended on a 2-roll mill at a temperature of 80° C. for 10 minutes and then cured between steel plates under a pressure of 1000 p.s.i. at a temperature of 177° C. for 60 minutes. The resulting unblown vulcanizate was a tough rubber substantially insoluble in toluene at 100° C.

*Example 3*

This example shows the covulcanization of natural rubber (smoked sheet #1) and an ethylene-propylene copolymer containing 70 mole percent of ethylene and having an RSV of 3.1. A blend of the polymers was prepared by blending 76 parts of the natural rubber with 52 parts of the ethylene-propylene copolymer on a rubber mill by conventional procedure. The blend was then dissolved in trichloroethylene in the ratio of 1 part of polymer blend per 50 parts of solvent. To an amount of this solution equivalent to 10 parts of polymer blend was added 0.5 part 1,10-decane bis(sulfonazide) and the solvent allowed to evaporate at room temperature. This mixture was cured by heating in a closed iron mold for 30 minutes at a temperature of 180° C. The resulting covulcanizate was a strong, tough rubber having a percent gel of 87.

*Example 4*

To 100 parts of a high-density polyethylene having an RSV of 2.8 was added 0.5 part of 1,10-decane bis(sulfonazide) dissolved in 250 parts of acetone. The resulting slurry was evaporated to dryness in vacuo and extruded through a 1-inch extruder at 165–170° C. The extruded material was then chopped into pellets and molded under a pressure of 1500 p.s.i. and a temperature of 204° C. for 15 minutes to form a 40 mil sheet. The resulting cross-linked sheet retained all of the excellent physical properties of the untreated plastic while exhibiting a greatly increased heat distortion temperature. The thus treated sheet was only very slightly discolored. That the polyethylene sheet was actually cross-linked was shown by the Tinius-Olsen flow as determined at a temperature of 174° C. and a pressure of 200 p.s.i. The Tinius-Olsen flow is an indication of the extent of cross-linking, a decrease in flow indicating an increase in cross-linking. An untreated sheet of polyethylene exhibited a flow of 1.5 inches in 92 seconds while the polysulfonazide treated sheet flowed only 0.23 inch in 120 seconds.

*Example 5*

To 100 parts of a black-filled, ozonized, high-density polyethylene having an RSV of 2.8 and containing 50 parts of high abrasion furnace black per 100 parts of polymer were added 2 parts of 1,10-decane bis(sulfonazide). The mixture was blended on a 2-roll mill at a temperature of 147° C. for 5 minutes and then cured between steel plates under a pressure of 1500 p.s.i. at a temperature of 204° C. for 15 minutes. The elongation of the polyethylene was greatly increased by the cross-linking treatment without impairing any of its other excellent physical properties. A sample of the cross-linked polyethylene exhibited an elongation of 450% while the untreated polyethylene had an elongation of approximately 21%. The tensile strength of the treated and untreated polyethylene was essentially the same.

What we claim and desire to protect by Letters Patent is:

1. A process of cross-linking a polymer containing at least about 25 mole percent of ethylene which comprises heating said polymer in the presence of an aliphatic polysulfonazide having the formula $$R(-SO_2N_3)_x$$

where $x$ is an integer from 2 to 20 and R is an organic radical containing from about 5 to about 30 carbon atoms selected from the group consisting of aliphatic and aryl aliphatic radicals, said sulfonazide groups being attached to aliphatic carbon atoms.

2. The process of claim 1 wherein the aliphatic polysulfonazide is 1,10-decane bis(sulfonazide).

3. The process of claim 1 wherein the polymer is polyethylene.

4. The process of claim 1 wherein the polymer is a hydrocarbon copolymer.

5. A process of cross-linking an ethylene-propylene copolymer containing at least 25 mole percent ethylene, which comprises heating said ethylene-propylene copolymer in the presence of 1,10-decane bis(sulfonazide).

6. A polymer containing at least about 25 mole percent of ethylene cross-linked with an aliphatic polysulfonazide having the formula $$R(-SO_2N_3)_x$$

where $x$ is an integer from 2 to 20 and R is an organic radical containing from about 5 to about 30 carbon atoms selected from the group consisting of aliphatic and aryl aliphatic radicals, said sulfonazide groups being attached to aliphatic carbon atoms.

7. The product of claim 6 wherein the aliphatic polysulfonazide is 1,10-decane bis(sulfonazide).

8. The product of claim 6 wherein the polymer is a polyethylene.

9. The product of claim 6 wherein the polymer is a hydrocarbon copolymer.

10. An ethylene-propylene copolymer containing at least about 25 mole percent ethylene cross-linked with 1,10-decane bis(sulfonazide).

References Cited by the Examiner

UNITED STATES PATENTS

| | | | |
|---|---|---|---|
| 2,830,029 | 4/58 | Adams | 260—2.5 |
| 3,012,016 | 12/61 | Kirk et al. | 260—94.9 |
| 3,058,944 | 10/62 | Breslow et al. | 260—79.3 |
| 3,075,950 | 1/63 | Newland | 260—94.9 |

JOSEPH L. SCHOFER, *Primary Examiner.*

H. N. BURSTEIN, WILLIAM H. SHORT, *Examiners.*